United States Patent Office 3,613,473
Patented Oct. 19, 1971

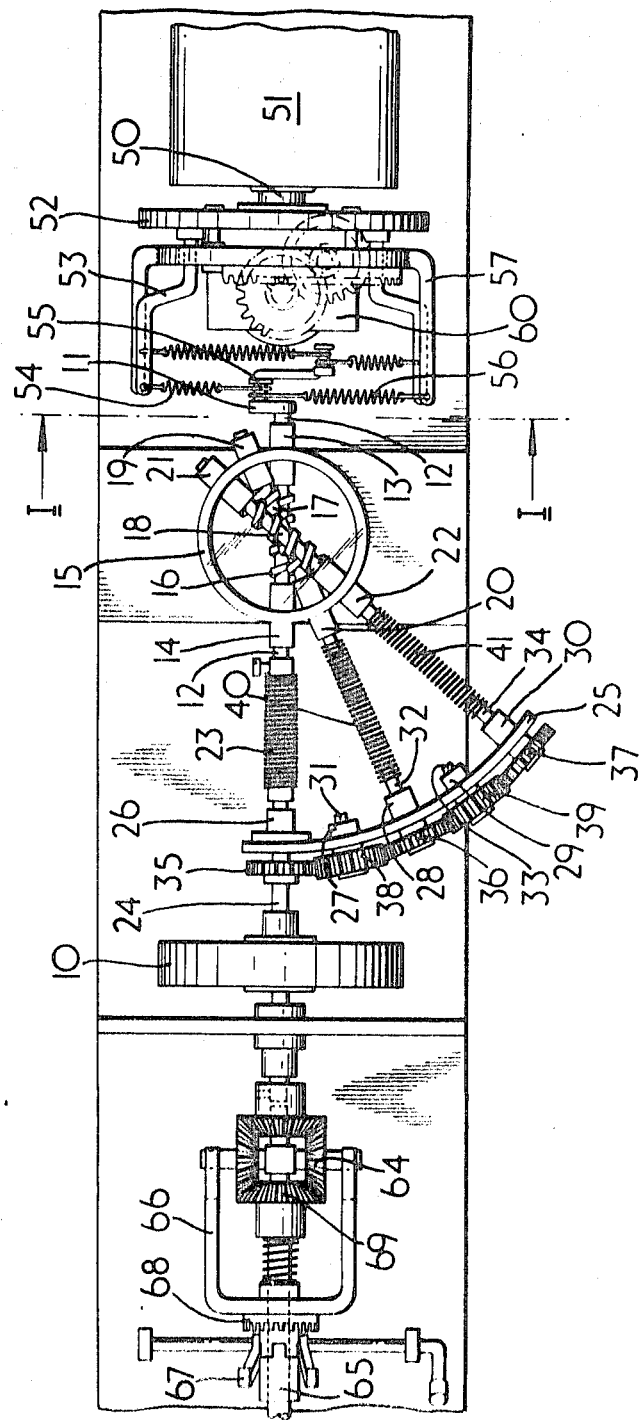

3,613,473
UNIDIRECTIONAL DRIVE ELEMENT
Roy Cyril Vaughan, Dublin, Ireland, assignor of a fractional part interest to Alan Salisbury Lamburn, Gloucestershire, England
Filed Nov. 20, 1969, Ser. No. 878,296
Claims priority, application Great Britain, Nov. 30, 1968, 56,952/68
Int. Cl. F16h 1/08, 27/04, 57/00
U.S. Cl. 74—424.5
7 Claims

ABSTRACT OF THE DISCLOSURE

A unidirectional drive element, such as a free-wheel, includes a pair of meshing toothed members, for example worm gears of the same hand, and bias means urge the teeth of the gears together in one direction so that they jam when an attempt is made to rotate one gear in such a direction that its teeth move towards the contacting teeth of the other gear, but the bias means prevents the flanks on the opposite sides of the teeth from contacting so that they do not jam in the opposite direction of rotation.

---

The invention relates to a unidirectional drive element of the kind in which a first member is arranged to be rotatable relative to a second member in one direction, but is not rotatable relative thereto in the opposite direction of rotation.

Unidirectional drive elements of this kind are usable for example with both members rotatable, to constitute a unidirectional clutch, or with the second member stationary, to constitute a unidirectional brake. A well known example of a unidirectional drive element is a ratchet and pawl. While satisfactory for certain purposes, a ratchet and pawl is inherently noisy, operates in finite steps and is subject to wear which can be rapidly destructive if the relative motion between the members is oscillatory.

It is an object of the invention to reduce such disadvantages.

According to the invention, in a unidirectional drive element of the kind set forth, the first member is a first toothed gear, a second toothed gear is meshed with the first gear, the second member includes bearings defining the axes of rotation of the first and second gears, bias means are arranged to provide a sustained load between the flanks on the same side of the teeth of the first gear and the opposing flanks of the teeth of the second gear, and the gears are arranged such that, when the first gear is rotated so that the flank contacting the second gear tends to move towards the second gear, the gears will jam and inhibit rotation of the first gear in that direction, and when the first gear is rotated in the opposite direction the bias will keep the flanks on the other side of the teeth of the first gear from contacting the opposing flanks of the teeth of the second gear, whereby the gears will not jam and the first gear and the second gear will be able to rotate freely in that direction.

Conveniently, a third toothed gear is meshed with the second gear, the second member includes a bearing defining the axis of rotation of the third gear, further bias means are arranged to provide a sustained load between the flanks on the side of the teeth of the third gear and the opposing flanks of the second gear which are held in contact with the first gear by the first-mentioned bias means, whereby to reinforce the tendency of the first and second gears to jam in the appropriate direction while enabling the tendency of the gears to jam in the other direction to be reduced.

Desirably, at least two of the gears are worm gears of which the axes are inclined at an angle substantially equal to the sum of the angles on each gear between the teeth and a plane normal to the axis of the corresponding gear. Preferably, the worm gears are of the same pitch circle diameter and tooth inclination.

Conveniently, at least one bias means includes a prewound torsionally resilient member connected at one end to rotate one of the gears and connected at the other end to be inhibited from unwinding by another of the gears. Furthermore, the unidirectional drive element may include means for reversing the direction of the bias between each pair of gears, whereby to interchange the direction of rotation in which rotation is permitted or inhibited.

In the case where the unidirectional drive element is arranged as a unidirectional brake, the second member is conveniently a gear casing means.

The invention is described, with reference to the accompanying drawing, as applied, by way of example only, to a unidirectional brake for use in a variable ratio power transmission.

In the drawing the component to the right of the line I—I, and to the left of a flywheel 10 form no part of this invention, and are not discussed further in detail.

In operation, a crankshaft 11 is subjected to an oscillatory torque, so that at different times it is tending to rotate in opposite directions. The crankshaft 11 is formed on the end of a main shaft 12, which is carried in bearings 13, 14 in a gear casing 15. A centre portion of the main shaft 12 is formed as a first worm gear 16. A second worm gear 17, identical to the first worm gear 16 is positioned above, and meshed therewith. Similarly a third worm gear 18, identical to the first worm gear 16 is positioned above and meshed with the second worm gear 17. The second and third worm gears 17, 18 are carried in bearings 19, 20, 21, 22 respectively, fast in the gear casing 15. Clearly, the angle between each pair of meshing worm gears is equal to the sum of the angle between the teeth on each worm gear and a plane normal to its axis.

The output end of the main shaft 12 is connected to drive a first torsionally resilient spring 23, of which the output is fastened to an output shaft 24. A stationary structural member 25 has bearings 26, 27, 28, 29, 30 in which are carried respectively the output shaft 24 and stub shafts 31, 32, 33 and 34. A spur gear 35 fast on the output shaft 24 is identical to spur gears 36, 37 fast on the stub shafts 32, 34 respectively. The gears 35 and 36 are connected by an idler gear 38 on the stub shaft 31, and the gears 36, 37 are connected by an idler gear 39 on the stub shaft 33. The second worm gear 17 and the stub shaft 32 are interconnected by a torsionally resilient spring 40, and the third worm gear 18 and the stub shaft 34 are interconnected by a torsionally resilient spring 41. If preferred an unshown compression strut, having a bearing at each end, may be mounted inside the spring 40 between the opposing ends of the second worm gear 17 and the stub shaft 32, to relieve them of end thrust due to tension in the spring 40.

In the following description of operation of the unidirectional brake, the functioning of the third worm gear 18 is initially disregarded. The pitch of the teeth on the worm gears 16, 17 are chosen, in conjunction with the surface finish and material used, such that when the second worm gear 17 is free to rotate, any attempt to rotate the first worm gear 16 in either direction will cause it to jam against the second worm gear 17. In this way, it is impossible for drive to be transmitted in either direction along the shaft 12. However, if the torsionally resilient spring 40 is prewound, the second worm gear 17 will be biased in one direction against the flanks on one side of the teeth of the first worm gear 16. An attempt to rotate the shaft 12 in one direction will now further increase the loading between the flanks of the teeth of the first and second worm gears 16, 17, which will further inhibit rotation of the shaft 12 in that direction. However, an attempt to rotate the shaft 12 in the opposite direction will cause the other flanks of the teeth of the first and second worm gears 16, 17 to move towards each other, which would still cause jamming if those flanks came into contact. The prewind of the spring 14 is tending to keep the latter flanks separated, so that in this direction of rotation the second worm gear 17 will have no effect on the first worm gear 16, and as fast as the shaft 12 rotates in the latter direction, the gear train comprising the spur gears 35, 38, 36, sustain the prewind in the spring 40, so that the flanks of the first and second worm gears 16, 17 do not contact in this direction of rotation. Clearly, rotation of the shaft 12 in one direction is now inhibited, whilst rotation in the other direction is freely possible.

For any given combination of material used in the worm gears 16, 17, together with their surface finish, tooth form, pitch, and the lubricant used, there is a minimum angle between the axes of the worm gears below which the worm gears will not readily free after they have been jammed together. Furthermore, there is a maximum allowable angle between the axes of the worm gears 16, 17, above which they will slip in both directions. For certain applications it may be found that the range of angle between the aforesaid minimum and maximum angles is impractically narrow, or even non-existent. In these circumstances use may be made of the third worm gear 18, together with its prewound spring 41 and gear train 39, 37. The operation of the third worm gear 18 relative to the second worm gear 17 is exactly the same as the relative operation between the second worm gear 17 and the first worm gear 16. However, the angle between the axes of the first and the second worm gears 16, 17 and between the axes of the second worm and third worm gears 17, 18 may now be chosen to be greater than the aforesaid minimum angle. Although there will still be a tendency for the worm gears to slip, it will be found that the third worm gear 18 exerts an adequate control over the second worm gear 17 to prevent it rotating, and allowing relative slip between the first worm gear 16 and the second worm gear 17, when slip is undesirable. For worm gears made of mild steel, I have found that an angle between each adjacent pair of gears is conveniently approximately 24°.

Although the first, second, and third worm gears 16, 17 and 18 have been described as being of identical material and size, they could be made of any other material suitable for the application, and could be made of different sizes, provided that the drive ratio between the spur gears 35, 36, and 37 were adjusted accordingly, and provided that the required jamming condition in one direction of rotation and free running in the other direction of rotation was attained. Furthermore, any other type of gear or combination of gears which satisfies this requirement could be used.

Clearly by reversing the direction of prewind in the springs 40, 41, the directions in which free running and jamming are attained can be reversed. In this way the unidirectional brake may be made reversible. Although apparatus to effect the change of prewind in the springs 40, 41 has not been shown, there are many ways of doing this which would not present any difficulty to those versed in the art and would be devised in relation to the particular layout and use of the unidirectional brake.

Clearly the embodiment described could be used as a unidirectional clutch by adapting the casing 15 to be a driver or driven member.

To provide greater tooth contact areas the worm gears can be of waisted or "hour-glass" type known per se.

What I claim as my invention and desire to secure by Letters Patent of the United States is:

1. A unidirectional drive element comprising,
   a first member in the form of a first toothed gear,
   a second member, the first member being rotatable relative to the second member in one direction but not rotatable relative thereto in the other direction of rotation,
   a second toothed gear meshed with the first toothed gear,
   bearing surfaces defined by the second member by which surfaces the first and second gears are rotatably supported,
   and bias means providing a sustained load between flanks on the same side of the teeth of the first gear and opposing flanks of the teeth of the second gear,
   the first and second gears being arranged so that, when the first gear is rotated so that the flank contacting the second gear tends to move towards the second gear, the gears will jam and inhibit rotation of the first gear in that direction,
   and, when the first gear is rotated in the opposite direction, the bias means will keep the flanks on the other side of the teeth of the first gear from contacting the opposing flanks of the teeth of the second gear, whereby the gears will not jam and the first gear and the second gear will be able to rotate freely in that direction.

2. A unidirectional drive element, as in claim 1, including a third toothed gear meshed with the second gear, the second member defines bearing surfaces by which the third gear is rotatively supported, further bias means are arranged to provide a sustained load between the flanks on the side of the teeth of the third gear and the opposing flanks of the second gear which are held in contact with the first gear by the first-mentioned bias means, whereby to reinforce the tendency of the first and second gears to jam in the appropriate direction while enabling the tendency of the gears to jam in the other direction to be reduced.

3. A unidirectional drive element, as in claim 1, in which at least two of the gears are worm gears of which the axes are inclined at an angle substantially equal to the sum of the angles on each gear between the teeth and a plane normal to the axis of the corresponding gear.

4. A unidirectional drive element, as in claim 3, in which the worm gears are of the same pitch circle diameter and tooth inclination.

5. A unidirectional drive element, as in claim 1, in which at least one bias means includes a prewound torsionally resilient member connected at one end to rotate one of the gears and connected at the other end to be inhibited from unwinding by another of the gears.

6. A unidirectional drive element, as in claim 1, including means for reversing the direction of the bias between each pair of gears, whereby to interchange the direction of rotation in which rotation is permitted or inhibited.

7. A unidirectional drive element, as in claim 1, arranged as a unidirectional brake, in which the second member is a gear casing means.

References Cited

UNITED STATES PATENTS 3,481,215  12/1969  Howell _____ 74—424.5

LEONARD H. GERIN, Primary Examiner

U.S. Cl. X.R.

74—84, 411